(12) United States Patent
Kim et al.

(10) Patent No.: US 11,401,049 B2
(45) Date of Patent: Aug. 2, 2022

(54) PASSENGER HAND LUGGAGE CHECKING SYSTEM AND METHOD FOR AIRPORT

(71) Applicant: CAS Corporation, Yangju-si (KR)

(72) Inventors: Kyung Min Kim, Seoul (KR); Kwan Ho Tho, Yangju-si (KR); Yun Ju Choi, Seoul (KR); Dong Jin Kim, Seoul (KR)

(73) Assignee: CAS Corporation, Yangju-si (KR)

( * ) Notice: Subject to any disclaimer, the term of this patent is extended or adjusted under 35 U.S.C. 154(b) by 0 days.

(21) Appl. No.: 17/311,127

(22) PCT Filed: Apr. 15, 2019

(86) PCT No.: PCT/KR2019/004524
§ 371 (c)(1),
(2) Date: Jun. 4, 2021

(87) PCT Pub. No.: WO2020/116723
PCT Pub. Date: Jun. 11, 2020

(65) Prior Publication Data
US 2021/0354851 A1    Nov. 18, 2021

(30) Foreign Application Priority Data
Dec. 5, 2018 (KR) .................. 10-2018-0155579

(51) Int. Cl.
*G01B 11/02* (2006.01)
*B64F 1/36* (2017.01)
(Continued)

(52) U.S. Cl.
CPC ............... *B64F 1/36* (2013.01); *G01B 11/02* (2013.01); *G01B 17/06* (2013.01); *G01D 21/02* (2013.01); *G01G 17/00* (2013.01)

(58) Field of Classification Search
CPC ........ G01B 11/02; G01B 11/14; G01B 17/06; G01N 2015/1497; G01N 2015/1493;
(Continued)

(56) References Cited

U.S. PATENT DOCUMENTS 6,669,012 B1 * 12/2003 Yoshida ............... B65G 17/345
198/890
6,895,801 B1 * 5/2005 Fine ..................... G01N 1/2202
422/89

(Continued)

FOREIGN PATENT DOCUMENTS

DE 102011117388 A1 5/2013
EP 1148316 A1 10/2001
(Continued)

*Primary Examiner* — Isiaka O Akanbi
(74) *Attorney, Agent, or Firm* — Novick, Kim & Lee, PLLC; Jae Youn Kim; Jihun Kim

(57) ABSTRACT

Proposed are a system and method for checking out a passenger hand-luggage in an airport. The system for checking out a passenger hand-luggage in an airport includes: a platform configured to load a passenger hand-luggage thereon; a weight measurer configured to measure a weight of the passenger hand-luggage loaded onto the platform; a size measurer configured to measure a size of the passenger hand-luggage loaded onto the platform; an allowance-information provider configured to provide allowance information based on the loaded passenger hand-luggage; and a regulation-based determiner configured to compare the weight and size of the passenger hand-luggage measured by the weight measurer and the size measurer with an allowance allowed for the loaded passenger hand-luggage, and provide check-out information about whether the passenger hand-luggage loaded onto the platform is within the allowance.

10 Claims, 6 Drawing Sheets

(51) Int. Cl.
*G01B 17/06* (2006.01)
*G01D 21/02* (2006.01)
*G01G 17/00* (2006.01)

(58) Field of Classification Search
CPC .. G01N 2015/0294; B64F 1/36; G01D 21/02; G01G 17/00
USPC ............... 356/492, 496, 485, 335, 4.03, 21; 702/127–128
See application file for complete search history.

(56) References Cited

U.S. PATENT DOCUMENTS

| | | | |
|---|---|---|---|
| 9,360,383 B2 * | 6/2016 | Coleman | ............... G01B 21/16 |
| 2006/0012144 A1 | 1/2006 | Kunzler et al. | |
| 2009/0314613 A1 * | 12/2009 | Jones | ...................... B64F 1/366 |
| | | | 198/804 |
| 2012/0175179 A1 | 7/2012 | Spector et al. | |
| 2012/0198914 A1 * | 8/2012 | Fine | ......................... G01N 1/02 |
| | | | 73/23.41 |
| 2013/0211864 A1 * | 8/2013 | Sanderson | ............. G06Q 10/02 |
| | | | 705/5 |
| 2014/0299389 A1 * | 10/2014 | Coleman | ............... G01G 3/1404 |
| | | | 198/804 |
| 2016/0187186 A1 * | 6/2016 | Coleman | ............... B66F 17/003 |
| | | | 177/1 |
| 2016/0187187 A1 * | 6/2016 | Coleman | ............. G01G 19/083 |
| | | | 177/45 |
| 2016/0187210 A1 * | 6/2016 | Coleman | ............. G01G 19/083 |
| | | | 73/862.639 |
| 2018/0032922 A1 * | 2/2018 | Sanderson | ............. G06Q 10/02 |
| 2018/0032923 A1 * | 2/2018 | Sanderson | ............. G06Q 10/02 |
| 2018/0322483 A1 * | 11/2018 | Castro Maillo | ......... B64F 1/368 |

FOREIGN PATENT DOCUMENTS

| | | |
|---|---|---|
| KR | 10-2001-0089533 A | 10/2001 |
| KR | 10-2003-0037288 A | 5/2003 |
| KR | 10-2006-0088356 A | 8/2006 |
| KR | 10-2014-0097590 A | 8/2014 |
| KR | 10-2018-0099648 A | 9/2018 |
| RU | 1816724 A1 | 5/1993 |

* cited by examiner

PASSENGER HAND LUGGAGE CHECKING SYSTEM AND METHOD FOR AIRPORT

TECHNICAL FIELD

The disclosure relates to a system and method for checking out a passenger hand-luggage in an airport, and more particularly to a system and method for checking out whether a hand luggage carried by an aircraft passenger is within limits allowed per passenger.

BACKGROUND ART

An aircraft passenger can check in a luggage within a personally allowed range of weight, or carry a hand luggage on board within allowance stricter than that of the check-in luggage.

Conventionally, a luggage to be checked in has been weighed while a boarding pass is issued in a check-in counter. When the luggage is heavier than the allowed weight, a passenger has been informed of the overweight luggage and allowed to voluntarily lessen the luggage or additionally charged by his/her consent.

The allowance of the hand luggage has been treated case by case according to airports and airlines without any specially standardized process. For example, a passenger voluntarily measures or airline staff directly measure the weight of the luggage through a small weighing scale provided in a departure-lounge entrance of an airport terminal, an airline check-in counter, a departure gate, etc.

FIG. 1 illustrates a weighing scale system for measuring the weight of a luggage, which is currently managed by an airport, and includes a weighing scale 100 placed in a lower side, and a frame fence 200 installed around a weighing-scale tray for the luggage, preventing the luggage from falling, and checking out an approximate size of the luggage.

Such a weighing scale system for a luggage is inconvenient for a passenger because the luggage is required to be lifted up over the frame fence 200 and then put on the weighing scale 100, and has a substantive problem that necessary major information other than weight information is not provided.

In other words, the allowances of the hand luggage are limited to not only the weight but also the size, and the allowance of the hand luggage is different according to airline policies on a flight that a passenger gets on, flight information about America routes, Southeast-Asia routes, etc., and a membership grade related to mileage or the like that the passenger has.

Therefore, the existing weighing-scale system for a luggage is not practically helpful in determining whether a hand luggage carried by a passenger complies with airline regulations.

DISCLOSURE

Technical Problem

Accordingly, the disclosure is proposed to solve the foregoing problems of the related art, and an aspect of the disclosure is to provide a system and method for checking out a passenger hand-luggage in an airport, which automatically determines whether the passenger hand-luggage is within limits differently allowed according to passengers, thereby decreasing confusion about use of an aircraft and increasing convenience in the use.

Technical Solution

According to an aspect of the disclosure, there is provided a system for checking out a passenger hand-luggage in an airport, including: a platform configured to load a passenger hand-luggage thereon; a weight measurer configured to measure a weight of the passenger hand-luggage loaded onto the platform; a size measurer configured to measure a size of the passenger hand-luggage loaded onto the platform; an allowance-information provider configured to provide allowance information based on the loaded passenger hand-luggage; and a regulation-based determiner configured to compare the weight and size of the passenger hand-luggage measured by the weight measurer and the size measurer with an allowance allowed for the loaded passenger hand-luggage, and provide check-out information about whether the passenger hand-luggage loaded onto the platform is within the allowance.

Here, the system may further include a passenger identifier configured to obtain information about an aircraft passenger, wherein the allowance-information provider provides the allowance information based on the passenger information obtained by the passenger identifier. Further, the allowance-information provider may provide the allowance information based on at least one of an airline of an aircraft that will be boarded by a passenger, flight information, and a membership grade of the passenger from the passenger information, and the passenger identifier may include a user interface for allowing the passenger to input the passenger information, a scanner for scanning information about an airline ticket of the passenger, or a staff interface for allowing an airline staff to input the passenger information.

Further, the regulation-based determiner may include a display configured to output the check-out information, or a printer configured to print the check-out information to a sticker to be stuck onto the passenger hand-luggage, and the size measurer may include at least one of an ultrasonic sensor, an infrared sensor and an image sensor to perform measurement at three sides of the passenger hand-luggage.

Further, the platform may be buried in a floor and include a top surface formed level with the floor so that the passenger hand-luggage can be wheeled and loaded onto the top surface of the platform, and the size measurer may include a database in which a conversion relationship between a distance to a top of the passenger hand-luggage and an actual length based on a length on a photographed top image of the passenger hand-luggage is stored, and may include an image sensor configured to obtain an image of the top of the passenger hand-luggage from above the passenger hand-luggage.

According to another aspect of the disclosure, there is provided a method of checking out a passenger hand-luggage in an airport, including: by a sensor, checking out a state that a passenger hand-luggage is loaded onto a loading platform; by the sensor, measuring a weight and size of the passenger hand-luggage; through an interface, receiving passenger information of the passenger hand-luggage; checking out allowance information about a hand-luggage allowed for a passenger based on the passenger information; and determining whether the measured weight and size of the passenger hand-luggage are within allowance and providing a determination result.

Here, the receiving the passenger information may include scanning information contained in an airline ticket of the passenger, or allowing the passenger to input the passenger's own information through a user interface, and the measuring the size of the passenger hand-luggage may include: extracting an outline of a top of the passenger hand-luggage through an image sensor installed above or below the platform; measuring a distance from the image sensor to the top of the passenger hand-luggage; and deriving an actual length from an actual-length conversion relationship previously determined based on the measured distance and a length obtained from the outline.

Further, the receiving the passenger information may include receiving the passenger information by obtaining biometric information about the passenger through the sensor, and the allowance information may be provided based on at least one of an airline of an aircraft that will be boarded by the passenger, flight information, and a membership grade of the passenger from the passenger information.

Advantageous Effects

As described above, convenience in using an aircraft is improved because a passenger and airline staff can quickly and accurately check out the hand luggage.

BEST MODE

Below, embodiments of the disclosure will be described in detail with reference to the accompanying drawings.

Figure 1:
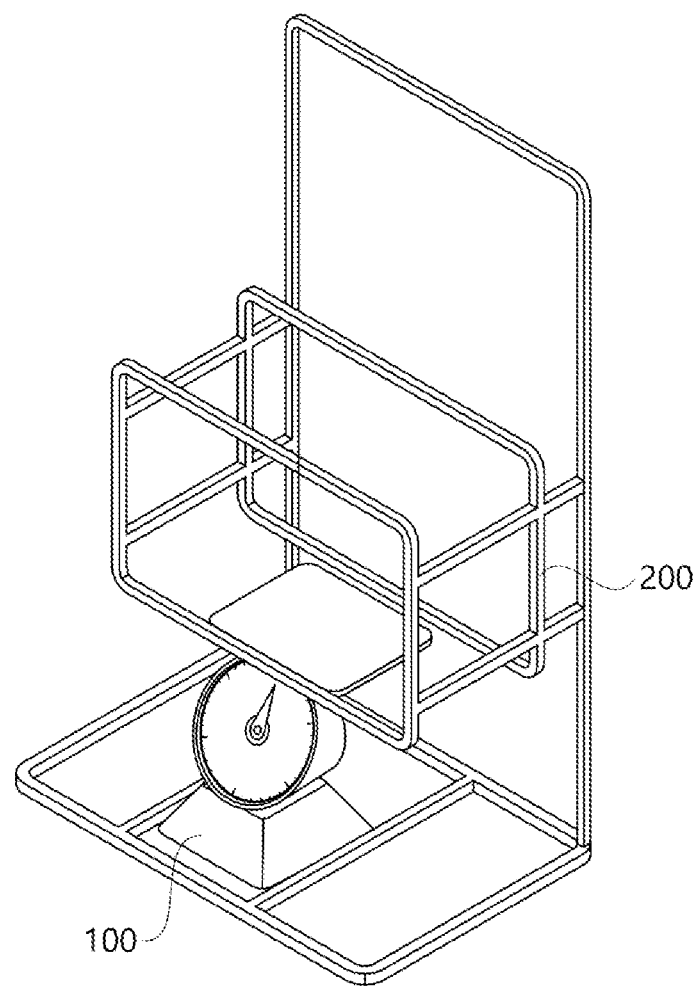
FIG. 1 is a schematic view of a conventional system for weighing a luggage in an airport.
Figure 2:
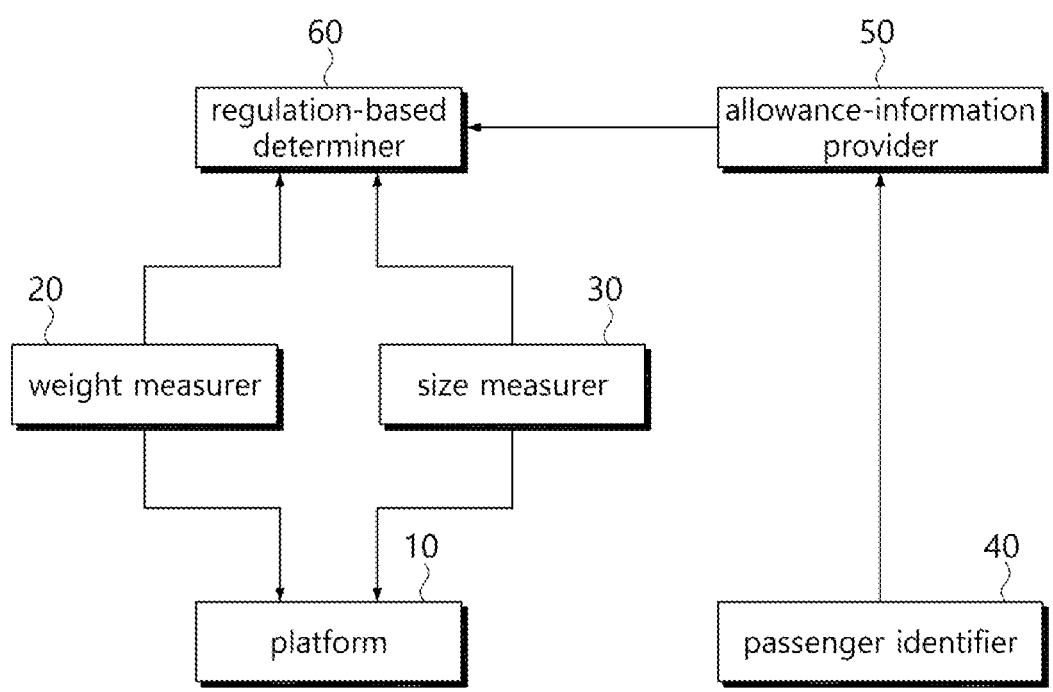
FIG. 2 is a block diagram of a system for checking out a passenger hand-luggage in an airport according to an embodiment of the disclosure.

FIG. 2 is a block diagram of a system for checking out a passenger hand-luggage in an airport according to an embodiment of the disclosure.

Referring to FIG. 2, a system for checking a passenger hand-luggage according to an embodiment of the disclosure includes a loading platform 10, a weight measurer 20, a size measurer 30, a passenger identifier 40, an allowance-information provider 50, and a regulation-based determiner 60.

The loading platform 10, onto which a passenger hand-luggage to be checked out is loaded, may be embodied by a panel or enclosure formed with a flat top to easily put the luggage thereon. The loading platform 10 may be formed with a slope so that a passenger can easily put a hand-luggage thereon, or may be formed level with a surrounding floor as buried in the floor without the slope so that the hand-luggage can be wheeled and loaded.

The weight measurer 20 may be embodied by a general weighing scale system to which a load cell, a strain gauge, an analog/digital (AD) converter, and the like provided under the loading platform 10 are coupled, and measures the weight of the passenger hand-luggage put on the platform 10.

The size measurer 30, which is to measure the size of the passenger hand-luggage loaded onto the loading platform 10, may, in case of a hand-luggage, be embodied by combination of sensors for measuring the height, length (breadth) and width (thickness) of the hand-luggage. To measure the lengths in triaxial directions, an ultrasonic sensor, an infrared sensor or the like generally used for measuring distances. According to an embodiment of the disclosure, an image sensor may be used when the design and the like of a product are taken into account, which will be described later, but the disclosure is not limited to this embodiment.

The passenger identifier 40, which is to input aircraft passenger information, may be embodied by a user interface capable of receiving an input of a passenger's own information; a scanner capable of scanning passenger information from a barcode, a quick response (QR) code, etc. of an airline ticket or passport; a staff interface capable of allowing an airline staff to input passenger information, etc.

The allowance-information provider 50 provides allowance information for a passenger hand-luggage, which is allowed according to passengers based on the passenger information. In other words, when the passenger information is confirmed, the allowance-information provider 50 may provide luggage-allowance information based on at least one of an airline of an aircraft that will be boarded by a passenger, flight information about a destination, and a membership grade of the passenger through a communication network connected to an airline database (DB).

The regulation-based determiner 60 compares a measured weight/size of a passenger hand-luggage and luggage limits allowed for a passenger, determines whether the passenger hand-luggage loaded onto the loading platform 10 is within the allowed limits, and provides check-out information as a result of the determination. Here, the check-out information may be showed to a passenger/airline staff as displayed on a display, and may be output through a printer as a sticker to be stuck onto the passenger hand-luggage.

Figure 3:
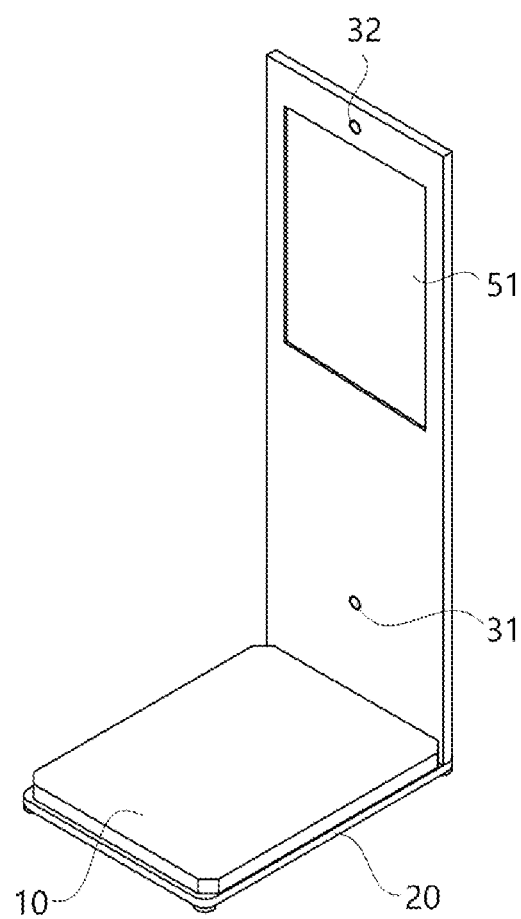
FIG. 3 is a schematic view of a terminal for checking out a passenger hand-luggage in an airport according to an embodiment of the disclosure.

FIG. 3 is a schematic view of a terminal for checking out a passenger hand-luggage in an airport according to an embodiment of the disclosure. Referring to FIG. 3, the terminal for checking out a passenger hand-luggage in an airport according to an embodiment of the disclosure is a stand-alone type, has an 'L'-shaped lateral cross-section, and is divided into a horizontal floor portion and a vertical portion.

The horizontal floor portion is provided as an enclosure formed with the loading platform 10 for putting a passenger hand-luggage thereon, and the weighing scale system of the weight measurer 20 is provided inside the enclosure.

The vertical portion is installed with a front display 51, and includes an image sensor 32 provided in an upper side of the display 51 and measuring the size of the passenger hand-luggage, and a proximity sensor 31 provided in a lower side of the display 51. The front display 51 is used in displaying various pieces of public information provided in the airport, corporate advertisement, measured weight and size information, allowance information, and the foregoing check-out information.

Figure 4A:
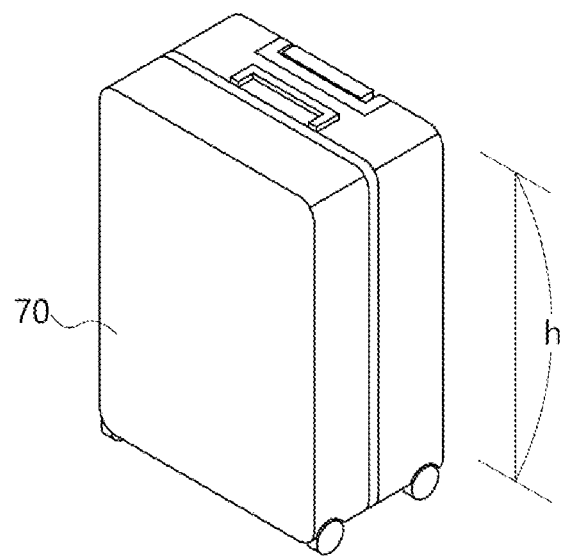
FIGS. 4A and 4B illustrate a traveling luggage according to an embodiment of the disclosure.
Figure 4B:
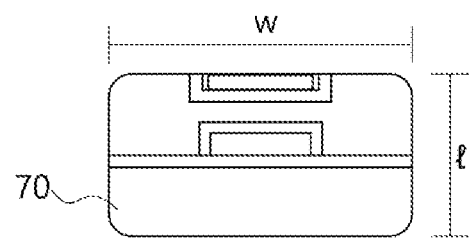

When a hand-luggage 70 shown in FIG. 4A is loaded onto the platform 10, the upper image sensor 32 obtains a top image of the luggage 70 as shown in FIG. 4B. Here, it is possible to determine the height of the luggage 70 by measuring a distance to the top of the luggage 70, and convert the measured breadth/thickness of the luggage 70 on the image into actual lengths. The distance from the image sensor 32 to the top of the luggage 70 may be extracted based on depth information used in a 3D camera, or by additionally using an ultrasonic/infrared (IR) sensor or the like.

For example, a length of 30 cm is taken as images while a distance from the image sensor 32 is increased in units of 5 cm, and information about the lengths on the taken images is accumulated, thereby deriving an actual length from the distances and the lengths on the images.

Thus, various actually measured lengths are taken as images at a plurality of distances, and the lengths on the images are measured and added to a database, so that the actual length can be inversely derived from the distance and the length on the image. When the database is constructed in a state that the image sensor 32 and the distance measuring sensor are stationarily installed, distortion caused when the measuring direction of the distance measuring sensor and the image sensor 32 are not centered upon the luggage 70 is naturally corrected.

The disclosure is not limited to the size measuring method based on the image sensor 32. The size measurer 30 according to an embodiment of the disclosure may employ an ultrasonic sensor or an IR sensor to measure the size of the luggage 70. However, a luggage 70 in this case needs to be placed at a preset position. For example, the back and left sides of the luggage 70 are required to be pressed against a right-angled corner, and the lengths are measured in such a manner that the ultrasonic sensor or IR sensor emits and receives an ultrasonic wave or IR light to and from the front and right sides of the luggage 70.

Figure 5:
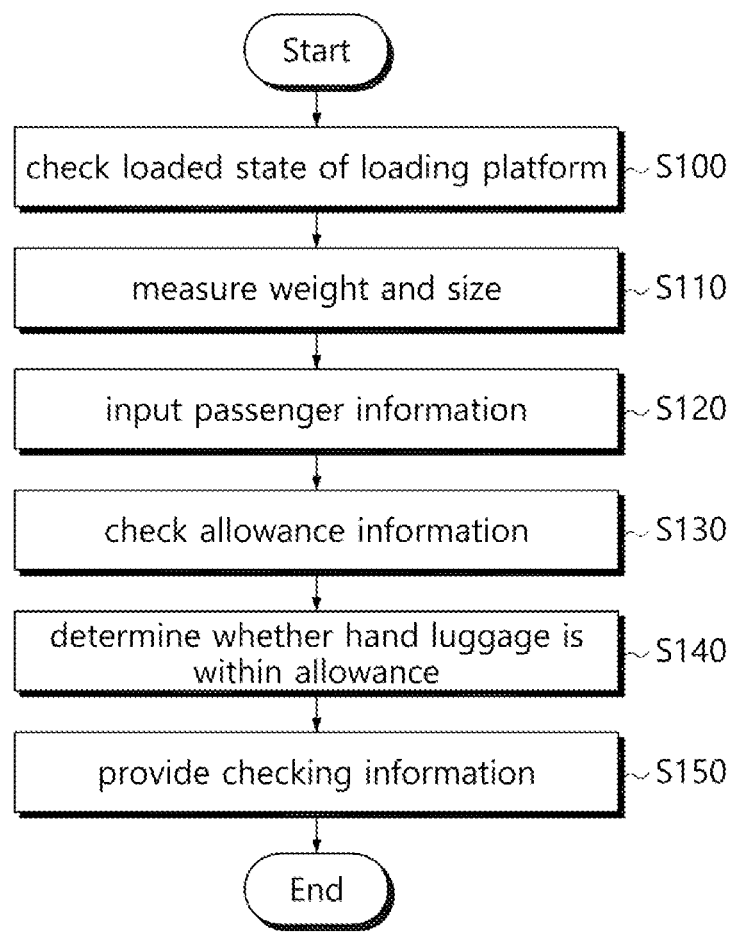
FIG. 5 is a flowchart of a method of checking out a passenger hand-luggage in an airport according to an embodiment of the disclosure.

FIG. 5 is a flowchart of a method of checking out a passenger hand-luggage in an airport according to an embodiment of the disclosure.

The operations of the system for checking out a passenger hand-luggage according to an embodiment of the disclosure shown in FIG. 2 will be described with reference to FIG. 5.

When a passenger puts a carryon luggage 70 on the platform 10, the proximity sensor 31, the image sensor 32 or the like checks out the loaded state of the luggage 70 onto the loading platform 10 (S100).

After checking out the loaded state, the weight measurer 20 and the size measurer 30 measure the weight and the size of the passenger hand-luggage 70 through the weighing scale, the image sensor 32 and the like sensor (S110).

Next, passenger information is obtained by scanning a barcode, a QR code, etc. of an airline ticket; recognizing biometric data such as a fingerprint, an iris, a vein, etc. of the passenger; scanning passport information of the passenger; allowing the passenger to directly input the passenger information; etc. (S120).

The passenger information is used as basic data for checking out the allowance information of the luggage allowed for the passenger (S130).

It is identified whether the measured weight and size of the passenger hand-luggage 70 are within the allowance (S140). Here, the allowance information is provided based on at least one of an airline of an aircraft that will be boarded by a passenger, flight information, and a membership grade of the passenger from the passenger information (S140).

In result, the check-out information is provided to the passenger or airline staff through the display 51, the printer, etc. (S150).

Thus, it is possible for a passenger to know whether the hand luggage 70 is allowable or not, by putting his/her hand luggage onto the platform 10 and providing his/her own information. Further, it is easy for an airline to check out the size/weight/allowance and thus proceed with a quick boarding process.

Figure 6:
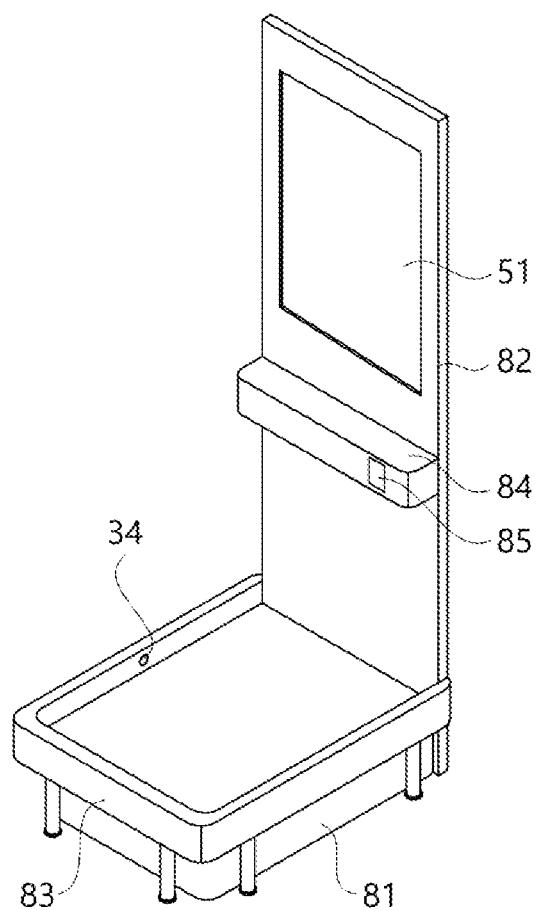
FIG. 6 is a schematic view of a terminal for checking out a passenger hand-luggage in an airport according to an alternative embodiment of the disclosure.

FIG. 6 is a schematic view of a terminal for checking out a passenger hand-luggage in an airport according to an alternative embodiment of the disclosure. Referring to FIG. 6, the terminal for checking out a passenger hand-luggage in an airport according to an embodiment of the disclosure is a stand-alone type, has an 'L'-shaped lateral cross-section, and is divided into a horizontal floor portion 81 and a vertical portion 82.

The horizontal floor portion 81 is provided as an enclosure formed with the loading platform 10 for putting a passenger hand-luggage thereon, and the weighing scale system of the weight measurer 20 is provided inside the enclosure. The loading platform 10 is provided with a frame 83 in which an ultrasonic or IR sensor 34 or the like of the size measurer 30 is installed.

The vertical portion 82 is installed with the front display 51, and includes a protrusion 84 placed below the display 51 and shaped like a bar. On the bottom of the protrusion 84, the ultrasonic or IR sensor 34 is provided to measure the height of the passenger hand-luggage. On the front of the protrusion 84, a scanner 85 is provided to scan an airline ticket of a passenger.

When the passenger puts a luggage on the loading platform 10, the dimensions of the luggage in the lengthwise (breadth) and widthwise (thickness) directions are measured through the ultrasonic or IR sensors 34 respectively installed at three sides of the frame 83, and the height of the luggage is measured through the ultrasonic or IR sensor 34 installed on the bottom of the protrusion 84 shaped like a bar.

As the airline ticket of the passenger is scanned by the scanner 85, the passenger information is provided to an airline DB, and luggage-limit information allowed per passenger returns. Then, the regulation-based determiner 60 compares the luggage measurement and the luggage-limit information allowed per passenger and provides a comparison result to the passenger through the display 51.

Although a few embodiments of the disclosure have been described, it will be appreciated by a person having an ordinary skill in the art that some substitutions and modifications can be made in the foregoing embodiments without departing from the technical spirit of the disclosure.

Accordingly, the foregoing embodiments are for illustrative purposes only, and it will be understood that the scope of the disclosure is defined in the appended claims and their equivalents.

The invention claimed is:

1. A system for checking out a passenger carry-on luggage in an airport, comprising:
   a terminal for checking out the passenger carry-on luggage, the terminal including a platform scale configured to load the passenger carry-on luggage thereon; and
   at least one sensor configured to:
      measure a weight of the passenger carry-on luggage loaded on the platform scale, and
      measure a size of the passenger carry-on luggage loaded on the platform scale; and
   wherein the system is configured to:
      obtain passenger information,
      provide luggage-limit information based on airline information of an aircraft that is to be boarded by a passenger, flight information, and a membership grade of the passenger obtained from the passenger information, and
      compare the weight and size of the passenger carry-on luggage with weight and size limits allowed for the passenger in the luggage-limit information, and provide check-out information as to whether the weight and size of the passenger carry-on luggage loaded on the platform scale are within the weight and size limits allowed for the passenger, wherein the system further comprises a user interface for allowing the passenger to input the passenger information, or a scanner for scanning information on an airline ticket of the passenger, wherein the terminal has a 'L'-shaped lateral cross-section, and includes a horizontal floor portion and a vertical portion extending directly from the floor portion in a vertical direction, wherein the horizontal floor portion includes the platform scale, wherein the vertical portion includes a front display, an image sensor positioned in an upper side of the front display, and a proximity sensor positioned in a lower side of the front display, such that the front display is positioned in between the image sensor and the proximity sensor, and wherein the platform scale is configured to be buried in a floor of the airport so as for a top surface of the platform scale to be placed on a level with the floor of the airport surrounding the platform scale so that the passenger carry-on luggage is to be wheeled and loaded onto the top surface of the platform scale.

2. The system according to claim 1, wherein the system further comprises a staff interface for allowing an airline staff to input the passenger information.

3. The system according to claim 1, wherein the system further comprises a display configured to output the check-out information, or a printer configured to print the check-out information on a sticker to be attached onto the passenger carry-on luggage.

4. The system according to claim 1, wherein the system further comprises a database in which a conversion relationship between a distance to a top of the passenger carry-on luggage and an actual length based on a length on a photographed top image of the passenger carry-on luggage is stored.

5. The system according to claim 4, wherein the image sensor is configured to obtain an image of the top of the passenger carry-on luggage from above the passenger carry-on luggage.

6. A method of checking out a passenger carry-on luggage in an airport, comprising:
    checking out a state that the passenger carry-on luggage is loaded onto a platform scale of a terminal;
    measuring, by at least one sensor, a weight and size of the passenger carry-on luggage;
    receiving passenger information of the passenger carry-on luggage;
    checking out luggage-limit information for a passenger based on airline information of an aircraft that is to be boarded by the passenger, flight information, and a membership grade of the passenger obtained from the passenger information; and
    determining whether the weight and size of the passenger carry-on luggage are within weight and size limits allowed for the passenger in the luggage-limit information and providing a determination result, wherein receiving the passenger information comprises scanning information contained in an airline ticket of the passenger, or allowing the passenger to input the passenger's own information through a user interface, wherein the terminal has a 'L'-shaped lateral cross-section, and includes a horizontal floor portion and a vertical portion extending directly from the floor portion in a vertical direction, wherein the horizontal floor portion includes the platform scale, wherein the vertical portion includes a front display, an image sensor positioned in an upper side of the front display, and a proximity sensor positioned in a lower side of the front display, such that the front display is positioned in between the image sensor and the proximity sensor, and wherein the platform scale is configured to be buried in a floor of the airport so as for a top surface of the platform to be placed level with the floor of the airport surrounding the platform scale so that the passenger carry-on luggage is to be wheeled and loaded onto the top surface of the platform scale.

7. The method according to claim 6, wherein measuring the size of the passenger carry-on luggage comprises:
    extracting an outline of a top of the passenger carry-on luggage through the image sensor;
    measuring a distance from the image sensor to the top of the passenger carry-on luggage; and
    deriving an actual length using a predetermined actual-length conversion relationship based on the measured distance and a length obtained from the outline.

8. The method according to claim 6, wherein receiving the passenger information comprises receiving the passenger information by obtaining biometric information about the passenger.

9. The method according to claim 6, wherein the image sensor is configured to obtain an image of a top of the passenger carry-on luggage from above the passenger carry-on luggage.

10. The method according to claim 6, further comprising:
    displaying the determination result on the front display or printing the determination result on a sticker to be attached onto the passenger carry-on luggage.

\* \* \* \* \*